United States Patent [19]

Madden

[11] 4,218,187

[45] Aug. 19, 1980

[54] CONSTANT FREQUENCY BIFILAR VIBRATION ABSORBER

[75] Inventor: John F. Madden, West Haven, Conn.

[73] Assignee: United Technologies Corporation, Hartford, Conn.

[21] Appl. No.: 931,034

[22] Filed: Aug. 4, 1978

[51] Int. Cl.² ............................................. B64C 27/32
[52] U.S. Cl. .................................... 416/145; 416/500; 74/574
[58] Field of Search ....................... 416/144, 145, 500; 74/574

[56] References Cited

U.S. PATENT DOCUMENTS

| 2,353,681 | 7/1944 | Martin et al. | 416/144 |
| 3,540,809 | 11/1970 | Paul et al. | 416/145 X |
| 3,874,818 | 4/1975 | Saunders et al. | 416/144 |
| 3,932,060 | 1/1976 | Vincent et al. | 416/145 |

Primary Examiner—Everette A. Powell, Jr.
Attorney, Agent, or Firm—Maurice B. Tasker; Vernon F. Hauschild

[57] ABSTRACT

A bifilar vibration absorber is provided for the main rotor of a helicopter in which the pendular mass is constrained so that the path of motion of its cg relative to the rotor hub is a cycloid.

4 Claims, 10 Drawing Figures

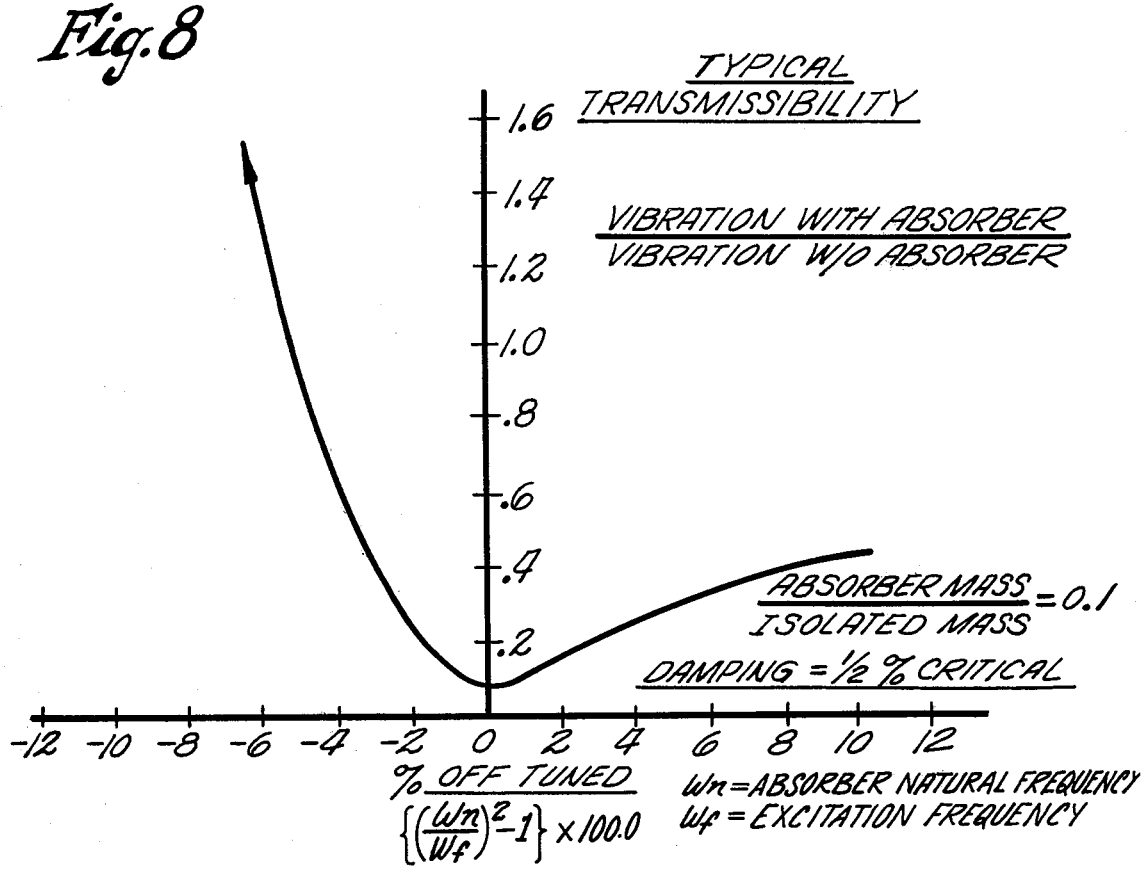
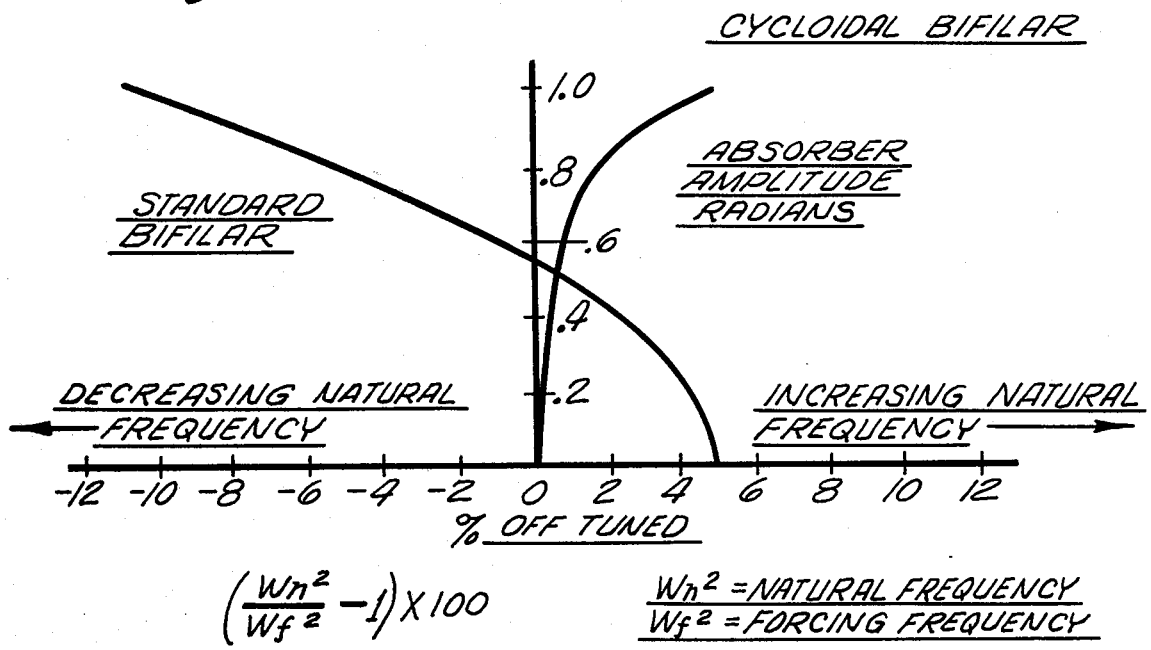

CONSTANT FREQUENCY BIFILAR VIBRATION ABSORBER

BACKGROUND OF THE INVENTION

1. Field of the Invention

This invention relates to helicopters in which in-plane rotor vibrations create vertical vibrations in the fuselage and more particularly to improved bifilar absorbers for absorbing such vibrations.

2. Description of the Prior Art

U.S. Pat. No. 3,540,809 issued Nov. 17, 1970 to W. F. Paul et al shows bifilar absorbers on a helicopter main rotor which consist essentially of radial support arms fixed to the rotor hub at the ends of which pendulous masses are supported by tuned pins which extend through circular apertures in the arms and in the masses, the apertures being circular and larger in diameter than the pins so that the pins are free to roll over arcuate surfaces of the apertures as the masses respond to vibrations in the rotor arms.

The bifilar system of the Paul et al patent has the disadvantage that the transmissibility of the bifilar absorber is a strong function of force input from the rotor, achieving maximum efficiency at only one force level. Since the force applied to a helicopter rotor is dependent upon flight conditions, this bifilar system of the Paul et al patent is fully efficient at only one flight condition. This characteristic of the bifilar system is due primarily to the amplitude dependency of the response character of the bifilar absorber.

SUMMARY OF THE INVENTION

It is a primary object of this invention to provide an improved bifilar absorber for use on helicopter main rotors which through the linearization of the frequency response of the bifilar operates at maximum efficiency over the entire flight regime.

Another object of this invention is to provide a bifilar absorber which has a substantially constant natural frequency.

A still further object of this invention is to provide a bifilar absorber having a decreasing radius of curvature in the path of movement of the absorber cg with amplitude in order to compensate for non-linear amplitude restoring effects.

More specifically it is an object of this invention to provide a bifilar absorber in which the pendular mass is constrained such that the path of motion of its center of gravity relative to the hub of the rotor is a cycloid.

Other objects and advantages of this invention are: toleration of larger pendular amplitudes, reduction in weight of the system, reduction in complexity of bifilar optimization problem, elimination of extensive flight test evaluation, assurance of maximum efficiency of bifilar operation at all times, and elimination of the possibility of vibration due to less than perfect design.

Other objects and advantages of the present invention may be seen by referring to the following description and claims, read in conjunction with the accompanying drawings.

BRIEF DESCRIPTION OF THE DRAWINGS

FIG. 8 is a graph showing transmissibility vs. percent off-tuned; and

FIG. 9 is a similar graph showing absorber amplitude in radians vs. percent off-tuned.

DESCRIPTION OF THE PREFERRED EMBODIMENT

Figure 1:
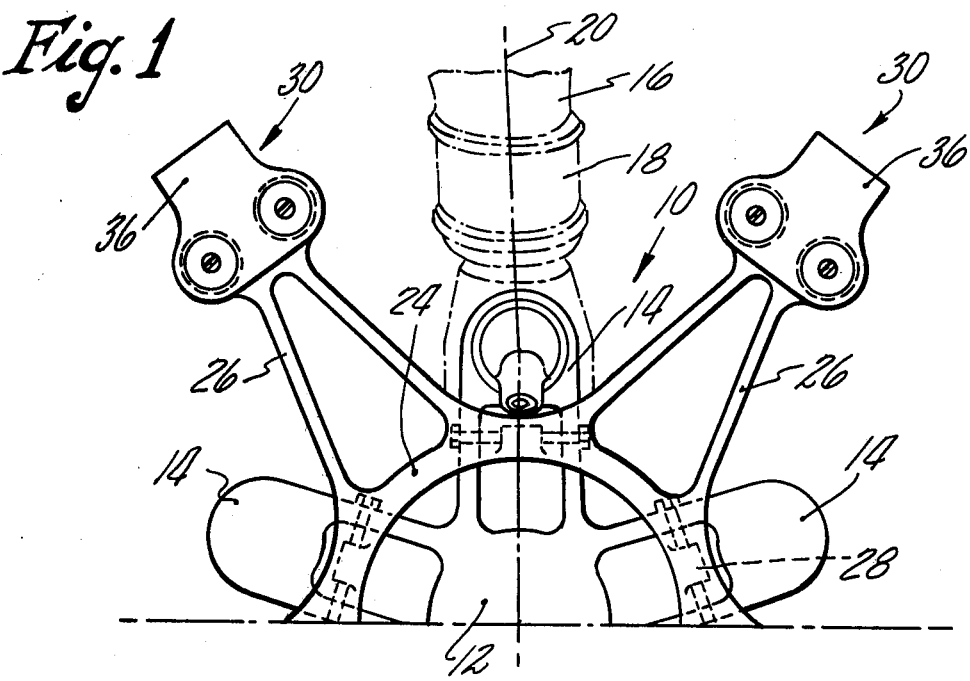
FIG. 1 is a partial plan view illustrating a typical five-bladed helicopter rotor equipped with bifilar absorbers.
Figure 2:
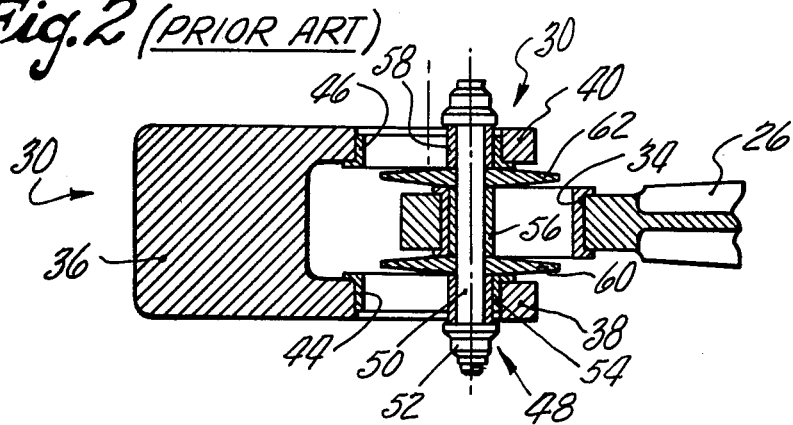
FIG. 2 is a vertical sectional view through a bifilar absorber of the prior art.
Figure 5:
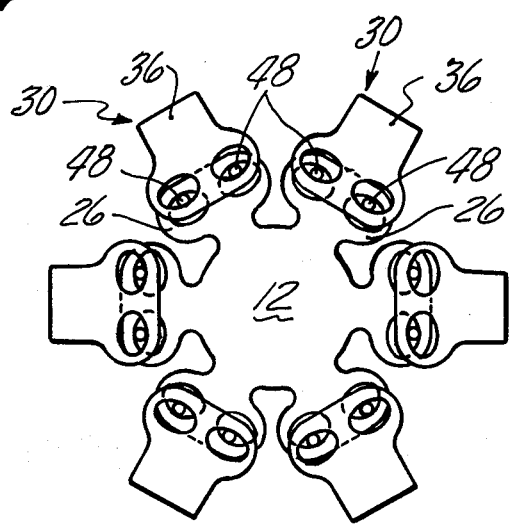
FIG. 5 is a simplified view of a helicopter rotor head showing six bifilar absorbers of this invention.
Figure 3:
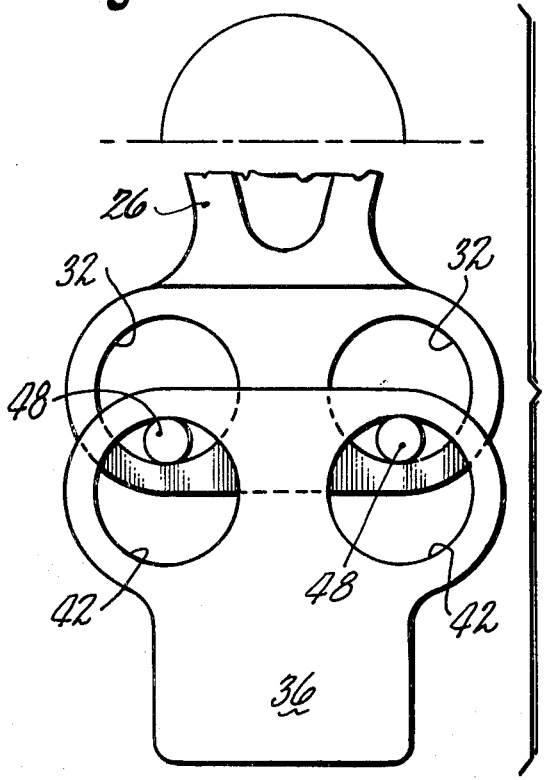
FIG. 3 is a somewhat simplified showing of the prior art bifilar absorber of FIG. 2 illustrating the circular holes in the bifilar mass and its supporting arm with the tuning pins which connect them.

In FIGS. 1, 2 and 3 the rotor head of the Paul U.S. Pat. No. 3,540,809 previously referred to herein, is shown. FIG. 1 shows a partial view of a five-bladed helicopter main rotor, generally indicated by 10, which is mounted at the upper end of a usual rotor drive shaft (not shown). The central part of the rotor 10 is hub 12 which includes radial arms, or plates, 14 projecting therefrom for rotation therewith to which rotor blades 16 are attached in either rigid or articulate fashion through sleeve and spindle assemblies 18. Blades 16 are preferably mounted for pitch change motion about feathering axes 20 and to be capable of changing pitch both cyclically and collectively.

A vibration absorber assembly is mounted on hub 12 for rotation with main rotor 10 and includes a star shaped support member comprising central ring member 24 and star point member 26 projecting radially therefrom in a plane parallel with the plane of blade rotation, as herein shown above the blades. Lugs 28 project downward from ring 24 and are bolted directly to plate members 14 of the hub assembly.

A bifilar vibration absorber 30 is located at the extremity of each star point member 26. Member 26 has two side-by-side circular holes 32 (FIG. 3) at its extremity provided with bushings 34 (FIG. 2) and pendulous member 36 which is of U-shaped cross section and has its two side plates 38 and 40 provided with two side-by-side circular holes 42 provided with bushings 44, 46. Member 36 is connected to arm 26 by two roll pins 48 which extend through the holes in arm 26 and side plates 38 and 40. Each roll pin 48 includes a bolt member 50 which has a nut 52 to position cylindrical spacers 54, 56 and 58 and annular washers 60 and 62 therebetween. Annular washers 60, 62 are thicker at their hubs and taper toward their circumference to reduce internal friction in the bifilar absorber. The structure thus far described is shown in the prior Paul et al patent.

In the operation of this prior art circular bifilar absorber, the pendulous movements of members 36 cause the pins 48 to roll over the confronting margins of the circular holes in arms 26 and side arms 38 and 40 on opposite sides of these pins, these movements being limited to a relatively small arcuate portion of the circular holes. This prior art construction was successful in greatly reducing vertical vibrations in the fuselage due to in-plane vibrations. However, the transmissibility of a bifilar absorber is a strong function of force input (blade loads) and achieves maximum efficiency at only one force level due to the amplitude dependency of the response characteristic of a bifilar absorber. As the force applied to a rotor head is dependent upon flight condition, this means that the bifilar system is fully effective at only one flight condition. As the amplitude of the bifilar changes, the resonant frequency changes. It is the relative location of the resonant frequency and the frequency of the force input which defines the efficiency of the bifilar, maximum efficiency being achieved only when the bifilar natural frequency is equal to the forcing frequency. Therefore the bifilar must operate at a definite amplitude due to rotor forces which are not known to a great degree of accuracy. The correct design of the prior art circular bifilar thus presents a complex problem, generally forcing extensive flight tests of different bifilar configurations for each helicopter for a final design determination.

Figure 4:
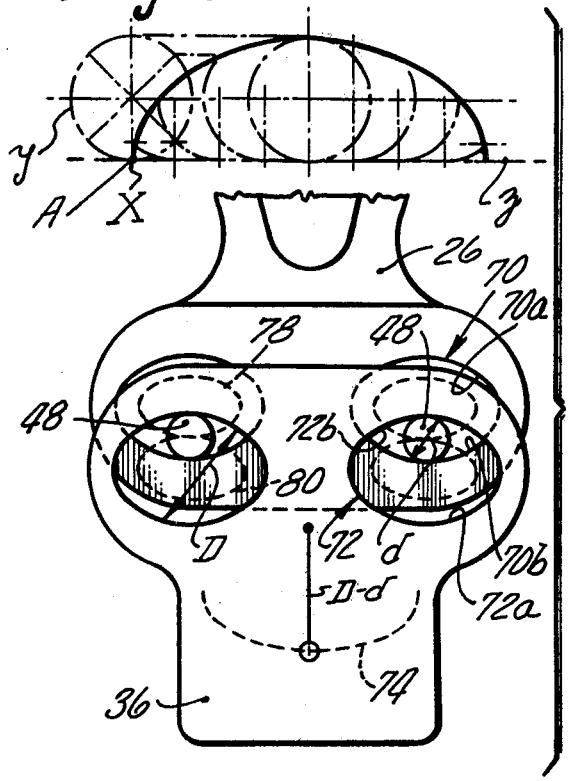
FIG. 4 is a similar view to FIG. 3 showing the bifilar absorber of this invention.
Figure 6:
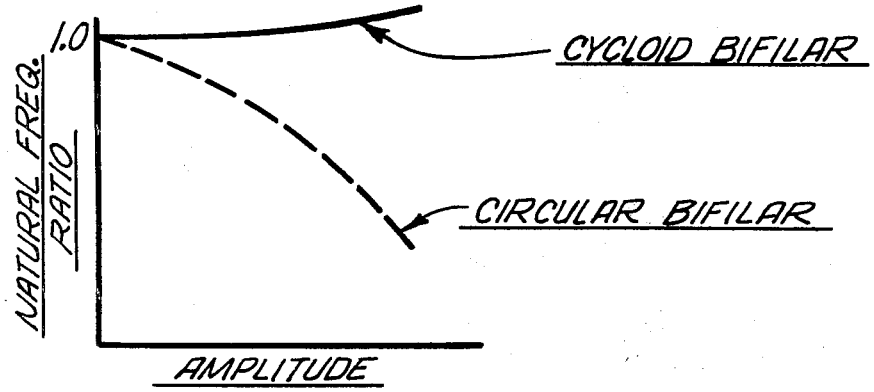
FIG. 6 is a linear graph illustrating the relative amplitude and natural frequency ratios of the prior art circular bifilar and the improved bifilar of this invention.
Figure 7:
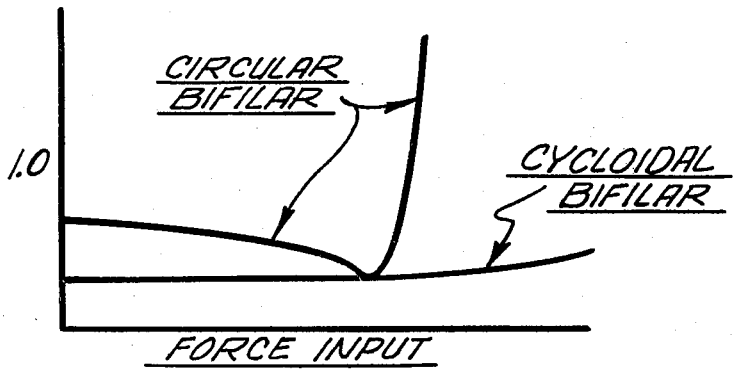
FIG. 7 is a similar linear graph illustrating transmissibility vs. applied force for circular and cycloid absorbers.
Figure 10:
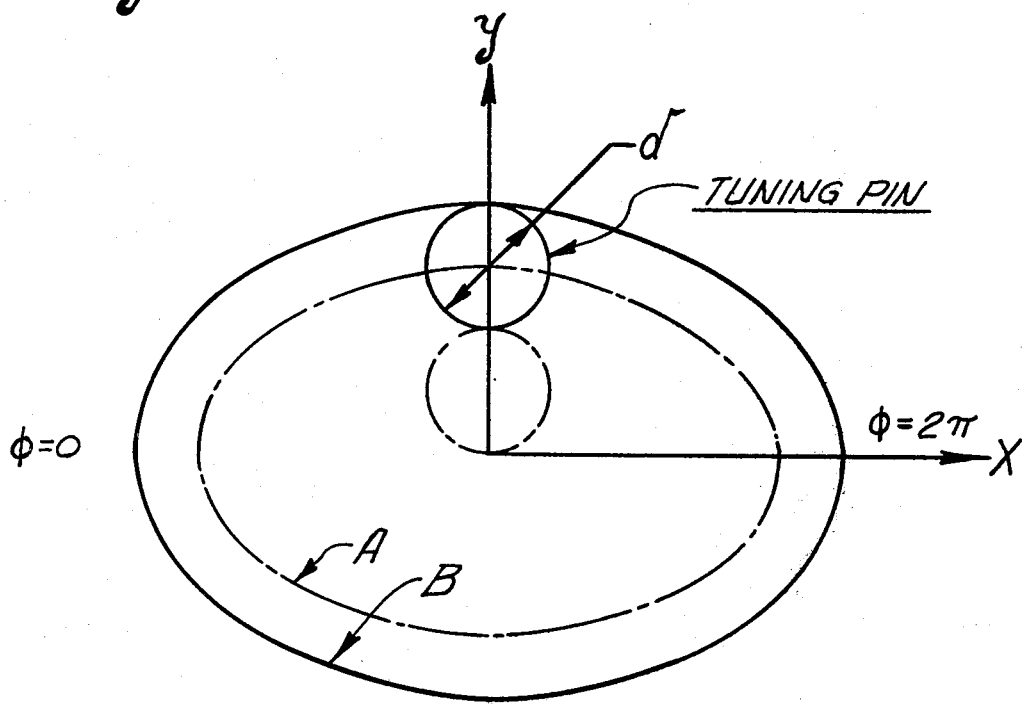
FIG. 10 is a diagramatic view showing the path of the cg of the tuning pin.

The improved bifilar absorber of this invention, shown diagramatically in FIG. 4, differs from the circular bifilar of FIG. 3 in the shape of the holes 70 in the supporting arm 26 and the holes 72 in the pendulous mass 36. These holes instead of being circular are formed so that the path of movement of the cg of the pendulous mass is a cycloid rather than the arc of a circle. This is accomplished by machining holes 70 and 72 in bifilar support arm and mass 36 so that the longitudinal centerline of the roll pins 48 move in a cycloidal path as indicated diagramatically in dotted lines in FIG. 4. The machining of holes 70, 72 in order to effect movement of the centerline of pins 48 in a cycloidal path and consequently the movement of the cg of mass 36 in a cycloidal path can be performed as follows, with reference to FIG. 10.

Contour B ~ Contour of Bushing $$X = a(\phi - \sin \phi - \pi) - d/2 \cos \phi/2$$

$$Y = a(1 - \cos \phi) + d/2 \sin \phi/2$$

Contour A ~ Path of Motion of ¢ of Tuning Pin $$X = a(\phi - \sin \phi - \pi)$$

$$Y = a(1 - \cos \phi)$$

Where:
a ~ Desired Size of Contour For Cycloidal Motion of Longitudinal Axis of Tuning Pin
$\phi$ ~ Roll Angle of Circle Defining Cycloidal Shape
d ~ Tuning Pin Diameter.

A cycloid by definition is the path a point x (FIG. 4) on the circumference of a circle y takes when the circle is rolled along a flat surface z. The cycloid contour is used in disclosing this invention to provide a decreasing radius of curvature of the path of motion of the absorber cg in order to compensate for non-linear amplitude restoring force effects. Any contour which produces a decrease in radius of curvature will produce the same type of effect, although the specific natural frequency at a given amplitude may be different from a cycloid and hence the invention in its broader aspects is not limited to the exact cycloid contour.

It will be noted that each hole 70 consists of two confronting cycloidal type curves 70a, 70b and that each hole 72 consists of two like confronting cycloidal type curves 72a, 72b. Only the curves 70b and 72b over which the pins 48 travel during pendulous movement of the mass 36 are used in the operation of the absorber. With the arrangement shown the cg of the mass 36 will move along a cycloid curve 74 having a radius in the zero amplitude position of the mass of D−d as indicated in FIG. 4. Cycloid curve 74 will, of course, be twice the size of the curves over which the pins 48 roll.

The principal advantages of the cycloidal, or constant frequency, rotor head absorber derive from the fact that the natural frequency of the absorber remains relatively constant as its amplitude is increased, and that the deviation from initial (zero amplitude) tuning is such that the natural frequency increases with amplitude. These characteristics are beneficial due to two fundamental characteristics of absorbers: (1) Optimum effectiveness is achieved when the natural frequency of the absorber is equal to the excitation or forcing frequency it is designed to suppress and (2) that if an absorber's natural frequency falls below the excitation frequency it no longer acts as a vibration suppression device but rather begins to actually increase the vibration levels of the system above that of an unisolated system.

The cycloidal, or constant frequency, bifilar, as its natural frequency stays much closer to its initial or zero amplitude natural frequency, operates much more efficiently than a standard circular bifilar as its natural frequency is much closer to the excitation frequency.

It can be seen in FIG. 9 that a circular bifilar, in order to operate properly at a practical amplitude, must be initially tuned to a frequency higher than the excitation frequency. Therefore for low amplitudes the standard bifilar is not as efficient as the cycloid bifilar, which is properly tuned. At high response amplitudes, the cycloidal bifilar natural frequency remains above the excitation frequency thereby continuing to provide isolation while the standard bifilar's natural frequency has dropped below the excitation frequency and is therefore no longer acting as an absorber.

The cycloidal absorber therefore acts as a more efficient vibration suppression device providing lower aircraft vibration levels over the entire operating regime of the absorber and can never cause aircraft vibration to increase above unisolated levels.

From the graphs it can be seen that to let a standard, or circular, absorber whose natural frequency drops off with amplitude operate at a finite amplitude at peak force it must be overtuned at low amplitude, thereby decreasing its effectiveness at low force levels. The cycloid bifilar does not require this overtuning, therefore it operates at maximum effectiveness at low amplitudes.

At high amplitudes, the standard absorber's amplitude causes its natural frequency to fall below the excitation frequency causing it not only to not isolate but actually to amplify the vibration. The cycloidal bifilar on the other hand does not drop in natural frequency and therefore continues to isolate even at high applied load levels. If the cycloid did not detune at all, it would operate at maximum possible effectiveness at all times. It does detune slightly, but it still operates at near maximum effectiveness.

While for purposes of illustration the preferred cycloidal contour has been described in detail, I do not want to be limited to this contour since this is only one mathematical curve which provides a decreasing radius of curvature of the path of motion of the absorber cg with changes of amplitude from its initial, or zero, amplitude position. Any contour which produces a decrease in radius of curvature will produce the same type of effect, although the specific natural frequency at a given amplitude may be different from that produced by a cycloid. In its broader aspects this invention contemplates the use of any contour which causes a decrease in radius of curvature of the path of motion of the cg in order to compensate for the drop-off in restoring force with amplitude in order to cause the natural frequency of the absorber to remain close to its natural frequency at zero amplitude.

While the invention has been described in connection with a helicopter rotor it will be understood that it is applicable to bifilar absorbers used on engine crankshafts in helicopters and fixed wing aircraft or anywhere that bifilar dampers are found desirable.

I wish it to be understood that I do not desire to be limited to the exact details of construction shown and described, for obvious modifications will occur to a person skilled in the art.

I claim:

1. A bifilar vibration absorber for a helicopter main rotor including a support rotatable with the rotor having two contoured holes, a pendulous mass having two contoured holes aligned with the holes in said support, roll pins extended through said aligned holes in said support and said mass, the contour of said holes over which said pins roll providing a continuously decreasing radius of curvature of the path of movement of the cg of said mass with changes of amplitude of said mass from its zero amplitude position.

2. The vibration absorber of claim 1 in which the margins of the holes in the support and the pendulous mass are contoured to provide progressively decreasing radius of curvature of the path of movement of the cg of said mass as the latter swings in either direction away from its zero amplitude position.

3. The bifilar vibration absorber of claim 1 in which the margin of the holes in the support and the pendulous mass over which said pins roll are of substantially cycloidal contour.

4. A bifilar absorber including a supporting arm having a hole adjacent its extremity, a pendulous mass having a hole aligned with the hole in said arm, means for supporting said mass for pendulous movement relative to said arm including a pin which extend through said holes in said arm and said mass, said pin being free to roll over the margins of said holes, the margins of said holes over which said pins roll contoured to provide a continuously decreasing radius of curvature of the path of movement of the cg of said mass as the latter moves in either direction away from its zero amplitude position.

* * * * *